Patented Oct. 4, 1932

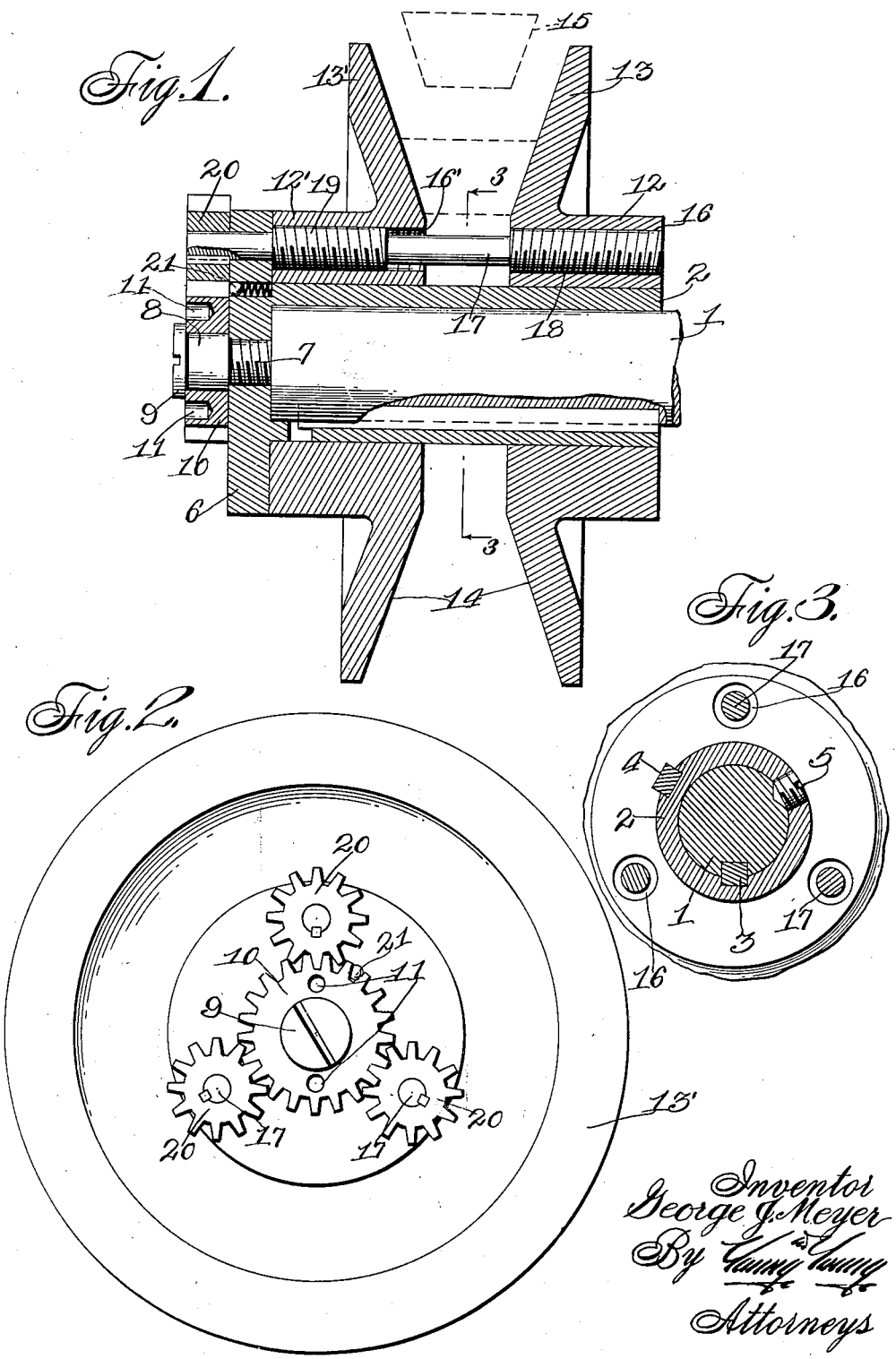

1,881,028

UNITED STATES PATENT OFFICE

GEORGE J. MEYER, OF CUDAHY, WISCONSIN

ADJUSTABLE PULLEY

Application filed August 25, 1930. Serial No. 477,736.

This invention relates to improvements in adjustable pulleys.

One of the objects of this invention is the provision of an adjustable pulley of the type particularly adapted for use in connection with V-shaped belts, and is so constructed as to provide for adjustment of the opposed sides of the pulley to vary the diameter of the pulley for taking up or letting out the slack in a fan belt or the like.

Another object of the present invention is the provision of an adjustable pulley of the above type provided with novel adjusting means so that the sides can be moved toward or away from each other for increasing or decreasing the diameter of the pulley, and taking up or letting out the slack of the belt, the adjusting means being equally distributed throughout the circumference of the pulley hub and adapted to be operated simultaneously.

A further object of the invention is the provision of an adjustable pulley of the above type which is preferably used on high speed motors, and wherein the sides of the pulley are adjusted simultaneously toward or away from each other and the adjusting means is securely retained against movement while the pulley is in use.

With the above and other objects in view, the invention consists in the novel features of construction, the combination and arrangement of parts hereinafter more fully set forth, pointed out in the claim and shown in the accompanying drawing wherein:

Figure 1 is a longitudinal sectional view through a pulley constructed in accordance with my invention, with parts thereof illustrated in elevation;

Figure 2 is an end elevation; and,

Figure 3 is a transverse section on the line 3—3 of Figure 1.

Referring more particularly to the drawing, 1 indicates a driven shaft and mounted upon this shaft is a sleeve 2 keyed thereto by means of the key 3, while the sleeve is held against longitudinal movement on the shaft by means of the set screw 5.

The end of the sleeve 2 at the outer end of the shaft 1 is provided with an enlarged flat head 6, and removably applied to the head is a screw member 7 carrying a smooth annular portion 8 having a slotted head 9. Rotatably mounted upon the annular portion 8 is a pinion 10 having oppositely disposed bores 11 adapted to be engaged by a specific type of tool for rotating this pinion on the annular portion 8.

Mounted upon the sleeve 2 are the hub portions 12 and 12' of the pulley members 13 and 13', the pulley members being provided with inwardly inclined side walls 14 between which a V-shaped belt 15 is positioned. The hub portions 12 are splined to the sleeve 2 by means of the key 4. The hub portions 12 and 12' are provided with annular spaced threaded bores 16 and 16', the bores being internally threaded in the opposite direction.

In order to provide means for moving the pulley sections toward and away from each other, I provide a plurality of small shafts 17 having threaded enlarged portions 18 adapted to cooperate with the threads in bores 16, while spaced from the threaded enlarged portions 18 are the threaded enlarged portions 19, the threads of which correspond to the threads in the bores 16' and the pitch of the threads being directly opposite of the pitch of the threads on the enlarged portions 18. The outer ends of the rods or shafts 17 project through suitable openings in the flanged head 6 and have mounted thereon the pinions 20 which are keyed to the shafts 17 and adapted to mesh with the pinion 10.

As illustrated in Figure 2, the pinions 20 are equally distributed around the circumference of the pinion 10, whereby through rotation of the pinion 10, shaft 17 will be simultaneously rotated to adjust the pulley sections toward and away from each other. In order to prevent accidental turning of pinion 10, a spring-pressed ball 21 is mounted in the bore in the head 6 and is adapted to engage between the teeth on pinion 10 a predetermined distance for retaining this pinion against accidental turning.

It will be apparent from the foregoing that an adjustable pulley is provided for use in connection with V-shaped belts wherein the sections of the pulley may be quickly or easily adjusted for increasing or decreasing the diameter of the pulley, to thus take up or let out the slack in the belt 15. The device is very simple in construction, and can be readily operated by engaging the bores 11 on pinion 10 with a tool adapted for this purpose, thus rotating pinions 20 for imparting rotative movement to shafts 17 to thus adjust the pulley sections toward or away from each other.

While I have described and illustrated only two pulley members 13 and 13' with belt engaging inclined portions, it will be apparent that should it be desired to use two belts, a center member could be anchored to sleeve 2 with tapered portions on opposite sides thereof to cooperate with the inclined faces 14 of pulley members 13 and 13', thus providing two tapered channels for belts, and the two pulley members 13 and 13' could be adjusted in the same manner as now illustrated and described.

Attention is also directed to the fact that the unit could be constructed to accommodate four belts by placing two additional double faced tapered members upon opposite sides of the center member and using the two present pulley sections 13 and 13' on the outside of the outermost unit. In other words, in addition to the centrally fixed unit with opposed tapered portions, two double tapered flanges could be used for the next belt with a single pitch screw for adjusting it and the two outermost flanges would be similar to that shown and described. However, this construction would necessitate a double pitch screw for the outer flanges, so as to have all spacing equal. For a considerable length of belt where an exact alignment would not be necessary, one flange could be fixed to the sleeve and the other merely threaded and screwed on the sleeve with an index pin to locate the second flange and hold it in a fixed position.

From this, it will be apparent that there are a great many ways in which this idea could be carried out for accommodating one or more belts, but the principal object of this invention is the provision of an adjustable pulley of the type described and illustrated wherein the adjustable means and the means for operating the same, is carried by and rotatable with the pulley sections, doing away with end thrust or other friction while the device is in motion.

I claim:

An adjustable pulley, comprising a sleeve provided with a flanged end, a pair of cooperating conical pulley flanges slidably mounted upon said sleeve, a shaft threaded into said flanges for relatively adjusting the same and having its end passing through the flange of said sleeve, a gear secured on the end of said shaft, a second gear secured to the face of said sleeve flange and meshing with the first mentioned gear for actuating the same, and means for resiliently latching the actuating gear against undesired movement.

In testimony that I claim the foregoing I have hereunto set my hand at Cudahy, in the county of Milwaukee and State of Wisconsin.

GEORGE J. MEYER.